Oct. 18, 1932.                S. L. PALMER                1,882,872
                              FUSIBLE METAL
                            Filed Nov. 10, 1928
FIG. I.
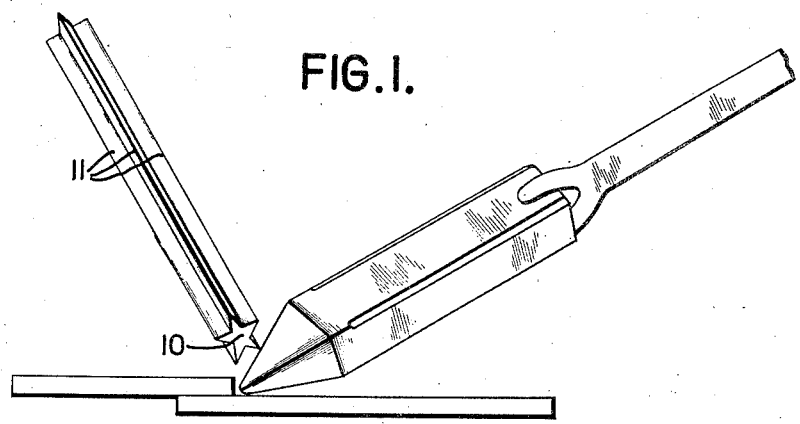
FIG. 2.         FIG. 4.         FIG. 6.
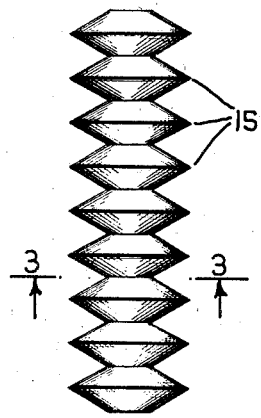    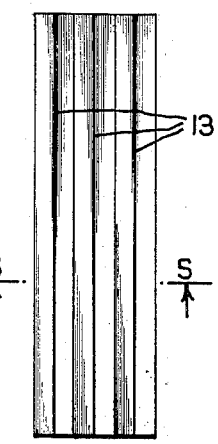    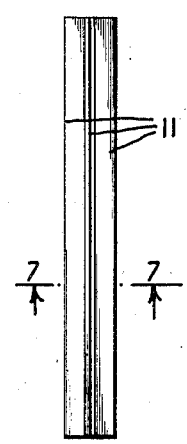
FIG. 3.         FIG. 5.         FIG. 7.
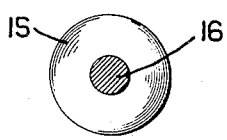    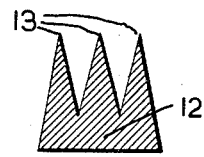    
Inventor
Sidney L. Palmer
By his Attorney Albert M. Austin Patented Oct. 18, 1932

1,882,872

UNITED STATES PATENT OFFICE

SIDNEY L. PALMER, OF SAN FRANCISCO, CALIFORNIA, ASSIGNOR TO AMERICAN SMELTING AND REFINING COMPANY, OF NEW YORK, N. Y., A CORPORATION OF NEW JERSEY

FUSIBLE METAL

Application filed November 10, 1928. Serial No. 318,439.

This invention relates to a new and improved form for fusible metals and metal alloys, and in particular, to a bar or strip of solder metal having projections which are capable of forming a point contact with the soldering tool or material which is to be joined together extending out from a central body portion or mass of the metal.

Solder metals, such as common tin, lead and alloys, have commonly been formed in rectangular bars, strips or as round wire which becomes fused by surface contact with a heated soldering tool. In materials of this kind the surface to which heat is applied by the tool is of comparatively large area thereby presenting a large mass of metal which must be heated to the fusion point before fusion may be initiated. This increases the time required in soldering operations, necessitates the use of a comparatively large soldering tool and results in a waste of solder, since a considerable quantity thereof is fused at each operation.

In accordance with the present invention the fusible metal is formed into a bar or wire composed of a main body portion of metal having radiating fins extending outwardly therefrom. The fins preferably converge in cross section to a point which is so positioned that it may be directly applied to the soldering tool or to the metal being joined.

The invention further provides for a point or line contact between the solder and the surface to which the same is applied, whereby only a comparatively small mass of solder must be heated to the fusion point in the beginning of the soldering operation, and the quantity melted may be regulated as desired in accordance with the requirements of the particular operation involved.

The invention also consists in certain new and original features of construction and combinations of parts hereinafter set forth and claimed.

Although the novel features which are believed to be characteristic of this invention will be particularly pointed out in the claims appended hereto, the invention itself, as to its objects and advantages, the mode of its operation and the manner of its organization may be better understood by referring to the following description taken in connection with the accompanying drawing forming a part thereof, in which Fig. 1 is a perspective view of one form of fusible metal constructed in accordance with the present invention showing the method of applying the same to the soldering tool;

Fig. 2 is a plan view of a strip of fusible metal having longitudinally spaced circular ribs;

Fig. 3 is a section taken on the line 3—3 of Fig. 2;

Fig. 4 is a plan view of a modified form for the fusible metal showing longitudinal ribs extending at one side thereof only;

Fig. 5 is a section taken along the line 5—5 of Fig. 4;

Fig. 6 is a plan view of a further modified form of solder metal showing a plurality of longitudinally extending, peripherally spaced ribs; and Fig. 7 is a section taken on the line 7—7 of Fig. 6.

In the following description and in the claims parts will be identified by specific names for convenience, but they are intended to be as generic in their application to similar parts as the art will permit.

In accordance with the present invention the fusible metal such as solder may be formed with a body portion 10 (Figs. 1 and 7) having a plurality of ribs 11 extending in a longitudinal direction of such body portion and spaced peripherally thereabout. A starlike section has been disclosed although it is not essential that the ribs be spaced equally about the body portion 10 and the number of ribs may be varied as desired.

In the modified form shown in Fig. 4, the body portion of the metal 12 is provided with a plurality of ribs 13 which are located on the same side thereof and are of such shape that a point contact may be made with a soldering tool in the manner disclosed in Fig. 1. The ribs have been shown as extending parallel to the direction of greatest length of the bar since this form is particularly adapted to the process of manufacture in which the metal is forced through a die in a manner well known in the art. The particular location of the ribs, however, is not important provided they are so positioned that a point contact with a soldering tool may be obtained.

In the modification shown in Figs. 2 and 3, a plurality of circular ribs 15 are formed about a central body 16. Said ribs are spaced longitudinally of said body and in addition to providing for the above mentioned point contact with the soldering tool, permit the strip of fusible metal to be readily broken into any desired length.

In beginning the soldering operation with a strip of solder or other fusible metal formed as above described, only a small mass of the material must be heated to the fusion point. Accordingly, almost immediate fusion takes place when a soldering tool is applied. Once the fusion is begun at the point of contact a rapid heat transfer takes place to the remainder of the metal and fusion of the entire mass is facilitated. Obviously if only a limited quantity of solder is required this amount can be obtained without fusing the remainder of the material.

Although certain preferred forms of the invention have been disclosed in the above specification, it is obvious that various changes may be made therein without departing from the scope of the invention which is defined by the following claims.

What is claimed is:

As an article of manufacture, a strip of metal which is readily fusible for purposes of soldering, welding and brazing having a starshaped cross section.

In testimony whereof I have hereunto set my hand.

SIDNEY L. PALMER.